United States Patent [19]
Riley et al.

[11] Patent Number: 6,131,025
[45] Date of Patent: *Oct. 10, 2000

[54] METHOD FOR PROVIDING UBIQUITOUS SERVICE TO MOBILE SUBSCRIBERS USING A WIRELESS GATEWAY SWITCH

[75] Inventors: Douglas Harvey Riley, Naperville; Jeffrey Arthur Zahnle, Elburn, both of Ill.

[73] Assignee: Lucent Technologies Inc., Del.

[ * ] Notice: This patent issued on a continued prosecution application filed under 37 CFR 1.53(d), and is subject to the twenty year patent term provisions of 35 U.S.C. 154(a)(2).

[21] Appl. No.: 08/752,766

[22] Filed: Nov. 20, 1996

[51] Int. Cl.$^7$ ....................................................... H04Q 7/22
[52] U.S. Cl. ........................................... 455/414; 455/432
[58] Field of Search .................................. 455/412–417, 455/432, 433

[56] References Cited

U.S. PATENT DOCUMENTS

| | | | |
|---|---|---|---|
| 5,481,592 | 1/1996 | Azer | 455/12.1 |
| 5,497,412 | 3/1996 | Lannen et al. | 455/432 |
| 5,530,945 | 6/1996 | Chavez, Jr. et al. | 455/411 |
| 5,781,858 | 7/1998 | Lannto et al. | 455/414 |
| 5,790,953 | 8/1998 | Wang et al. | 455/417 |
| 5,867,787 | 2/1999 | Vudali et al. | 455/433 |

FOREIGN PATENT DOCUMENTS

| | | | |
|---|---|---|---|
| 2206027 | 7/1997 | Canada | H04L 12/56 |
| WO9618273 | 6/1996 | WIPO | H04Q 7/24 |

OTHER PUBLICATIONS

J. Lantto, "Roaming Between Cellular Standards," ISS '95 World Telecommunications Congress, International Switching Symposium, pp. 241–245, Apr. 23, 1995.

*Primary Examiner*—Andrew M. Dolinar

[57] ABSTRACT

A method for providing universal access to service features by subscribers of a wireless telecommunications service provider comprises establishing a gateway switch interconnected to a plurality of mobile switching centers maintained by other wireless service providers. Trunk connections and signaling links between each mobile switching center and the gateway switch allow the gateway switch to establish call connections and apply service features. Advantageously, the gateway switch is responsible for applying service features and establishing call connection for its subscribers and thereby, results in predictable access to wireless telecommunications services.

9 Claims, 2 Drawing Sheets

METHOD FOR PROVIDING UBIQUITOUS SERVICE TO MOBILE SUBSCRIBERS USING A WIRELESS GATEWAY SWITCH

FIELD OF THE INVENTION

This invention relates to wireless telecommunications and, more particularly, to providing wireless telecommunications services to mobile subscribers.

BACKGROUND OF THE INVENTION

The worldwide proliferation of wireless (or "mobile") telecommunications services is a result of substantial cost breakthroughs in mobile telecommunications terminals, more commonly known as "wireless telephones". The cellular principle has also contributed to the growth of wireless telecommunications by enabling voice and data to be carried over an allocated radio spectrum to cell sites located across far-reaching geographic areas. Indeed, mobile subscribers use their wireless telephones most everywhere and expect service features to be accessible wherever wireless service is provided.

This expectation of readily available access to service features poses a significant problem for wireless telecommunications service providers. This is because all wireless telecommunications systems do not share a common air interface protocol. Therefore, roaming mobile subscribers (that is, those subscribers who access wireless services outside the geographic area served by their "home" system) must initiate the application of service features, such as call forwarding or voice mail, using different procedures than those used in their home system. There is also a possibility that some wireless telecommunications systems do not offer all the service features to which the roaming mobile subscribes. This inaccessibility to service features prohibits optimum use of wireless telephones and causes mobile subscriber inconvenience.

Therefore, there is a need in the art for providing wireless telecommunications services subscribers universal access to service features wherever wireless telecommunications services are provided.

SUMMARY OF THE INVENTION

This need is addressed and a technological advance is achieved in the wireless telecommunications art by a gateway switch for universally provisioning service features and establishing call connections.

In the preferred embodiment, the gateway switch is maintained by a wireless telecommunications service provider which does not maintain air interface systems. Mobile subscribers served by this wireless telecommunications service provider (hereinafter, the "ubiquitous provider") access the gateway switch via air interface systems (i.e., mobile switching centers) of other wireless service providers. The gateway switch retrieves subscriber-related information from a shared data base and establishes all call connections for the mobile subscriber.

More particularly, when a mobile subscriber of the ubiquitous provider originates a call, the mobile switching center serving the geographic area in which the subscriber is currently located is accessed. The mobile switching center uses call origination information to identify the mobile terminal as subscribing to services of the ubiquitous provider, and notifies the gateway switch of the registration via a provisioned signaling link. Subsequently, a trunk connection between the mobile switching center and the gateway switch is established. The mobile switching center acts as the air interface via which the ubiquitous provider establishes call connections and applies service features.

Advantageously, subscribers of the ubiquitous provider enjoy access to service features wherever wireless service is provided regardless of the capabilities of the wireless system serving as the air interface.

DETAILED DESCRIPTION

Figure 1:
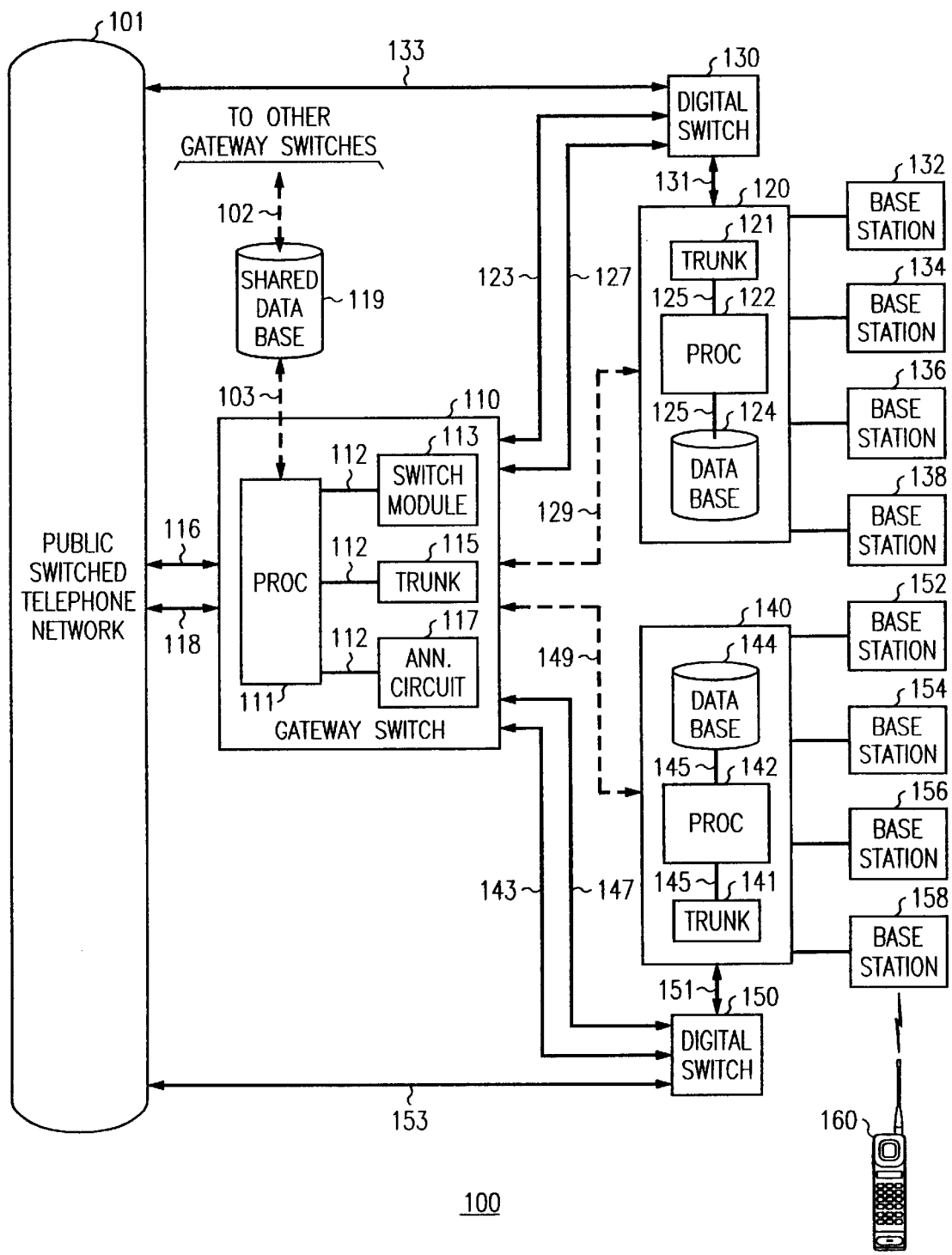
FIG. 1 is a simplified block diagram of a wireless telecommunications system in which the present invention may be practiced.

FIG. 1 shows a simplified block diagram of a portion of a wireless telecommunications system in which the preferred embodiment of the present invention may be practiced. More particularly, wireless telecommunications system 100 includes equipment maintained by a plurality of wireless telecommunications services providers. In this example, a ubiquitous provider maintains gateway switch 110, a first wireless telecommunications service provider maintains mobile switching center 120 and a second wireless telecommunications service provider maintains mobile switching center 140. In alternative embodiments, the ubiquitous provider may also maintain an air interface system. Gateway switch 110, mobile switching center 120 and mobile switching center 140 are all interconnected to the rest of public switched telephone network (PSTN) 101 by provisioned trunks, as described below.

In the preferred embodiment, gateway switch 110 is the AUTOPLEX® 1000 manufactured by Lucent Technologies, and serves the geographic region represented by telecommunications system 100. Gateway switch 110 comprises processor 111 interconnected, via data links 112, to switch module 113 for establishing call connections, trunk connection facility 115 for establishing connections to digital switches of mobile switching centers and announcement circuit 117 for issuing messages to callers. As is known in the art, processor 111 includes a limited amount of memory for storing data. Gateway switch 110 is also interconnected to shared data base 119 via data link 114. Shared data base 119 is accessed by gateway switches maintained by the ubiquitous provider, and stores subscriber-related service feature information and subscriber location information. In alternative embodiments, database 119 may be integrated with the gateway switch. In the preferred embodiment, the ubiquitous provider has many gateway switches located across a wide geographic area (e.g. across the United States) and maintains many shared subscriber data bases which are interconnected to shared data base 119 by a direct link, such as data link 102, or via indirect links through other signal transfer points.

Gateway switch 110 is shown with established bi-directional trunk connections 116, 118 to PSTN 101. Also shown is signaling link 129 interconnecting the gateway switch to mobile switching center 120 and bi-directional trunk connections 123, 127 interconnected to digital switch 130. Although bi-directional trunk connections are shown, other embodiments may employ a plurality of uni-directional trunk connections, as known in the art. Gateway switch 110 also maintains signaling link 149 to mobile switching center 140 and bi-directional trunk connections 143, 147 to digital switch 150. Signaling links 129 and 149 relay messages between gateway switch 110 and the mobile switching centers and are sometimes used to initiate service feature applications. Bi-directional trunks 123, 127 143 and 147 are used to establish call connections and may also be used by gateway switch 110 for service feature applications. In this example, shared data base 119 maintains subscriber-related service feature information and subscriber location data as described below.

Mobile switching center 120 comprises processor 122 interconnected to data base 124 via data link 125. Digital switch 130 is interconnected to PSTN 101 via bi-directional trunk 133 and to the mobile switching center via bi-directional trunk 131. Digital switch 130 is also interconnected to gateway switch 110 via bi-directional trunks 123, 127. In this example, mobile switching center 120 supports base stations 132, 134, 136 and 138. All mobile subscribers (that is, subscribers for which mobile switching center 120 is the "home" wireless system and subscribers roaming within the geographic area who are technologically compatible with mobile switching center 120) receive air interface services via the aforementioned base stations.

In this embodiment, mobile switching center 140 is maintained by a second wireless telecommunications service provider and may, or may not, be located in a geographic area distant from mobile switching center 120. Mobile switching center 140 comprises processor 142 interconnected to data base 144 via data link 145. Also shown is digital switch 150 interconnected to PSTN 101 via bi-directional trunk 153 and to mobile switching center 140 via bi-directional trunk 151. Digital switch 150 is also interconnected to gateway switch 110 via bi-directional trunks 143, 147. Mobile switching center 140 serves base stations 152, 154, 156, 158 and, more particularly, wireless telephone 160 interconnected to mobile switching center 140 via base station 158.

In the preferred embodiment, the user of wireless telephone 160 subscribes to services provided by the ubiquitous provider maintaining gateway switch 110. In this example, there is no "home" air interface system associated with the ubiquitous provider and hence, no "home" air interface system which serves the mobile subscriber. Gateway switch 110 establishes all call connections, and applies appropriate service features to wireless telephone 160. Data base 124 of mobile switching center 120 and data base 144 of mobile switching center 140 maintain identification data allowing these systems to recognize mobile subscribers (more particularly, directory numbers of mobile terminals) served by the ubiquitous provider. In alternative implementations with multiple ubiquitous providers, each mobile switching center must maintain data for identifying the mobile terminals of each provider. When a ubiquitous provider terminal is recognized, a trunk interconnecting the gateway switch to a digital switch of a mobile switching center is established, as known in the art. The trunk connection between gateway switch 110 and the digital switch enables the gateway switch to establish call connections and apply service features to mobile terminals served by the ubiquitous provider.

Figure 2:
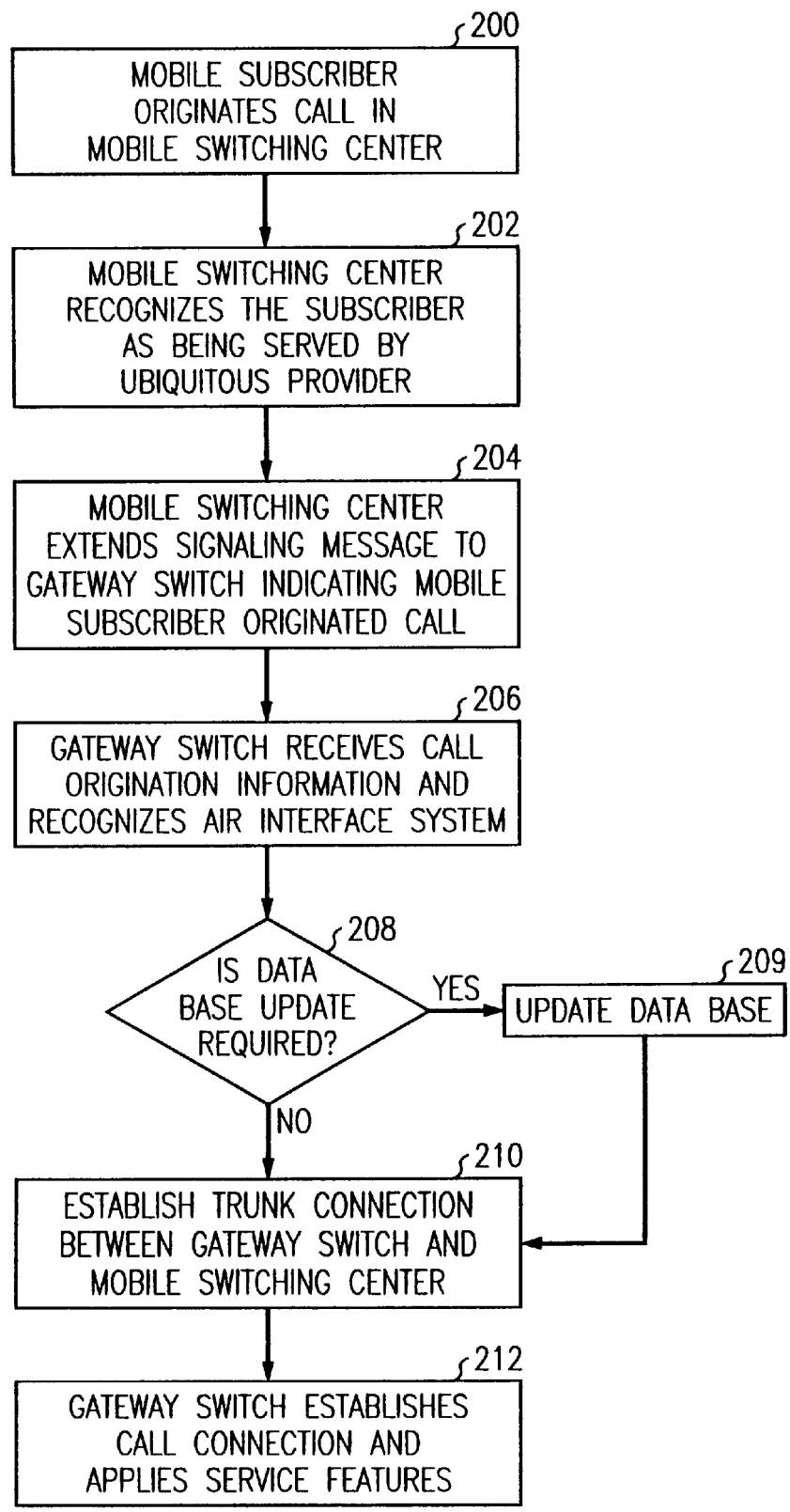
FIG. 2 is a flow diagram illustrating the steps performed in the wireless telecommunications system of FIG. 1 when a subscriber of a ubiquitous provider originates a call.

FIG. 2 illustrates the steps performed in wireless telecommunications system 100 when a subscriber of the ubiquitous provider originates a call. For clarity, continue with the example of the subscriber who uses wireless telephone 160 served by base station 158 of mobile switching center 140. The process begins in step 200 in which the subscriber originates a call in mobile switching center 140. As known in the art, the subscriber originates a call by dialing digits which initiate a series of messages (including the originating telephone's directory number) which are sent by wireless telephone 160 to the serving mobile switching center via the serving base station. In step 202, mobile switching center 140 recognizes (by the telephone's directory number transmitted during the call origination process) that wireless telephone 160 is a subscriber served by the ubiquitous provider. Although ubiquitous provider subscribers are recognized by directory numbers in this embodiment, those skilled in the art may derive other methods for recognizing a subscriber of the ubiquitous provider.

The process continues to step 204 in which mobile switching center 140 extends a signaling message to gateway switch 110 via signaling link 149 indicating that wireless telephone 160 has originated a call in mobile switching center 140. In step 206, gateway switch 110 receives the call origination information and recognizes the air interface system (that is, mobile switching center 140) from which the message is received using the identity of the signaling link. In decision step 208, the gateway switch determines whether shared data base 119 should be updated to reflect that mobile switching center 140 is the air interface system "on record" as serving the subscriber using wireless telephone 160. The database update is unnecessary if processor 111 of gateway switch 110 recognizes that the mobile subscriber's serving air interface system is unchanged from the "on record" system stored in the processor's memory from the last time that this particular subscriber attempted to originate a call. If the outcome of decision step 208 is a "YES" determination, the process continues to step 209 in which gateway switch 110 accesses shared data base 119 via data link 102 to update data contained therein before continuing to step 210 described below. If the outcome of decision step 208 is a "NO" determination, the process continues directly to step 210 in which a trunk connection between mobile switching center 140 and gateway switch 110 is established as is known in the art.

In step 212, gateway switch 110 establishes a call connection from the subscriber at wireless telephone 160 to a called party, and applies applicable service features to wireless telephone 160 via either the established trunk connection, or the serving air interface system. The serving air interface system applies service features as directed by the gateway switch with messages issued over signaling link 149.

Advantageously, subscribers of the ubiquitous provider have universal access to service features. This is because mobile switching centers of other wireless telecommunications service providers are used primarily as air interfaces and provide minimal substantive processing of call connections or service features. Although the present invention has been described with respect to the preferred embodiment, those skilled in the art may devise numerous other arrangements without departing from the scope of the invention as defined in the following claims.

What is claimed is:

1. A method for providing ubiquitous wireless service to a mobile subscriber unit, the method comprising the steps of:

A) the mobile subscriber unit originating a call at a first switching system, wherein the first switching system includes a base station for an over-the air interface to the mobile subscriber unit, and wherein the first switching system does not have direct access to service features associated with the mobile subscriber unit;

B) the first switching system determining that the mobile subscriber unit does not have access to service features associated with the mobile subscriber unit;

C) the first switching system making a signaling connection to a gateway switch that has access to stored service features for the mobile subscriber unit, wherein the gateway switch is not connected to directly provide an over-the-air interface to the mobile subscriber unit; and D) establishing a trunk connection between the first switching system and the gateway switch for the mobile subscriber unit;

E) the gateway switch establishing a call connection between a called party for the call and the mobile subscriber unit; and F) the gateway switch applying service features associated with the mobile subscriber unit to the call.

2. The method of claim 1 wherein the step of applying service features further comprises the step of applying service features over the trunk connection between the first switching system and the gateway switch.

3. The method of claim 1 wherein the step of applying service features further comprises the step of applying the service features over the signaling connection.

4. The method of claim 1 wherein the service features are stored in a shared database that is accessible by other gateway switches.

5. The method of claim 4 wherein the shared database is updated to reflect that the first switching system is serving the mobile subscriber unit.

6. In a telecommunications network comprising a gateway switch without an over-the-air interface for connecting to mobile subscriber units and a mobile switching system with at least one over-the-air interface for connecting to mobile subscribers, a method for providing ubiquitous wireless service to a mobile subscriber unit, the method comprising the steps of:

A) establishing a signaling connection between the gateway switch and the mobile switching system when the mobile subscriber unit is to be engaged in a call, wherein the gateway switch has access to stored service features for the mobile subscriber and the mobile switching system does not have direct access to service features for the mobile subscriber;

B) establishing a trunk connection between the mobile switching system and the gateway switch for the mobile subscriber unit;

C) the gateway switch establishing the call between the mobile subscriber unit and another party; and D) the gateway switch applying service features associated with the mobile subscriber unit to the cell.

7. A wireless telecommunications system comprising:

a gateway switch, the gateway switch not having an over-the-air interface for connecting to a mobile subscriber unit;

a trunk connection between the gateway switch and a mobile switching system, the mobile switching system including at least one over-the-air interface for connecting to the mobile subscriber unit;

a signaling connection between the gateway switch and the mobile switching system;

wherein the mobile switching systems does not have direct access to subscriber service features associated with the mobile subscriber unit;

wherein the gateway switch has access to stored subscriber service features associated with the mobile subscriber unit; and wherein when the mobile subscriber unit initiates a call at the mobile switching system, the gateway switch completes the call and applies subscriber service features associated with the mobile subscriber unit to the call.

8. The system of claim 7 wherein the signaling connection is used to indicate that the subscriber unit initiated a call.

9. The system of claim 7 wherein the call is connected to the mobile subscriber unit via the trunk connection.

* * * * *

UNITED STATES PATENT AND TRADEMARK OFFICE
CERTIFICATE OF CORRECTION

PATENT NO. : 6,131,025
DATED : October 10, 2000
INVENTOR(S) : Douglas Harvey Riley, et al.

It is certified that error appears in the above-identified patent and that said Letters Patent is hereby corrected as shown below:

<u>Title page,</u>
U.S. PATENT DOCUMENTS, add:
5,592,470          1/1997          Rudrapatna et al. 370/320

FOREIGN PATENT DOCUMENTS, add:
EP710043           5/1996          European Patent Application
WO9516330          6/1995          WIPO
H8-280058          10/1996         Japan
H8-214359          8/1996          Japan
H8-506713          7/1996          Japan Signed and Sealed this Twenty-third Day of October, 2001

*Attest:*

NICHOLAS P. GODICI
*Attesting Officer*     *Acting Director of the United States Patent and Trademark Office*